United States Patent
Schwarz et al.

(10) Patent No.: US 12,247,493 B2
(45) Date of Patent: *Mar. 11, 2025

(54) GAS TURBINE ENGINE FRONT SECTION

(71) Applicant: RTX CORPORATION, Farmington, CT (US)

(72) Inventors: Frederick M. Schwarz, Glastonbury, CT (US); William G. Sheridan, Southington, CT (US)

(73) Assignee: RTX CORPORATION, Farmington, CT (US)

( * ) Notice: Subject to any disclaimer, the term of this patent is extended or adjusted under 35 U.S.C. 154(b) by 244 days.

This patent is subject to a terminal disclaimer.

(21) Appl. No.: 17/969,179

(22) Filed: Oct. 19, 2022

(65) Prior Publication Data
US 2023/0042974 A1 Feb. 9, 2023

Related U.S. Application Data

(63) Continuation of application No. 17/337,658, filed on Jun. 3, 2021, now Pat. No. 11,506,084, which is a
(Continued)

(51) Int. Cl.
*F02C 7/36* (2006.01)
*F01D 5/02* (2006.01)
(Continued)

(52) U.S. Cl.
CPC .............. *F01D 25/24* (2013.01); *F01D 5/02* (2013.01); *F01D 5/12* (2013.01); *F01D 17/105* (2013.01);
(Continued)

(58) Field of Classification Search
CPC ................... F05D 2260/4031; F05D 2260/403
See application file for complete search history.

(56) References Cited

U.S. PATENT DOCUMENTS 2,154,532 A 4/1939 Ryder
2,258,792 A 10/1941 New
(Continued)

FOREIGN PATENT DOCUMENTS

EP 0791383 A1 8/1997
EP 1142850 A1 10/2001
(Continued)

OTHER PUBLICATIONS

Hill, P.G., Peterson, C.R. (1965). Mechanics and thermodynamics of propulsion. Addison-Wesley Publishing Company, Inc. pp. 307-308.
(Continued)

*Primary Examiner* — Gerald L Sung
(74) *Attorney, Agent, or Firm* — Carlson, Gaskey & Olds, P.C.

(57) ABSTRACT

A gas turbine engine includes, among other things, a propulsor section including a propulsor hub, the hub including a hub diameter supporting a plurality of propulsor blades. A compressor section includes a first compressor and a second compressor. A turbine section includes a first turbine and a second turbine. A geared architecture interconnects the first turbine and the propulsor hub. The geared architecture includes a gear volume. A compressor inlet passage is disposed annularly about the geared architecture.

30 Claims, 3 Drawing Sheets

Related U.S. Application Data continuation of application No. 15/007,263, filed on Jan. 27, 2016, now Pat. No. 11,053,816, which is a continuation of application No. 14/785,872, filed as application No. PCT/US2014/035821 on Apr. 29, 2014, now Pat. No. 10,287,917.

(60) Provisional application No. 61/821,371, filed on May 9, 2013.

(51) Int. Cl.
| | |
|---|---|
| *F01D 5/12* | (2006.01) |
| *F01D 17/10* | (2006.01) |
| *F01D 25/24* | (2006.01) |
| *F02C 3/107* | (2006.01) |
| *F02K 3/06* | (2006.01) |
| *F04D 29/32* | (2006.01) |
| *F16H 1/28* | (2006.01) |

(52) U.S. Cl.
CPC .............. *F02C 3/107* (2013.01); *F02K 3/06* (2013.01); *F04D 29/321* (2013.01); *F16H 1/28* (2013.01); *F02C 7/36* (2013.01); *F05D 2220/32* (2013.01); *F05D 2220/36* (2013.01); *F05D 2230/60* (2013.01); *F05D 2240/24* (2013.01); *F05D 2250/51* (2013.01); *F05D 2260/40311* (2013.01)

(56) References Cited

U.S. PATENT DOCUMENTS

| | | | |
|---|---|---|---|
| 2,936,655 | A | 5/1960 | Peterson et al. |
| 3,021,731 | A | 2/1962 | Stoeckicht |
| 3,194,487 | A | 7/1965 | Tyler et al. |
| 3,287,906 | A | 11/1966 | McCormick |
| 3,352,178 | A | 11/1967 | Lindgren et al. |
| 3,412,560 | A | 11/1968 | Gaubatz |
| 3,664,612 | A | 5/1972 | Skidmore et al. |
| 3,747,343 | A | 7/1973 | Rosen |
| 3,754,484 | A | 8/1973 | Roberts |
| 3,765,623 | A | 10/1973 | Donelson et al. |
| 3,820,719 | A | 6/1974 | Clark et al. |
| 3,843,277 | A | 10/1974 | Ehrich |
| 3,892,358 | A | 7/1975 | Gisslen |
| 3,932,058 | A | 1/1976 | Harner et al. |
| 3,935,558 | A | 1/1976 | Miller et al. |
| 3,988,889 | A | 11/1976 | Chamay et al. |
| 4,129,984 | A | 12/1978 | Nelson |
| 4,130,872 | A | 12/1978 | Haloff |
| 4,220,171 | A | 9/1980 | Ruehr et al. |
| 4,240,250 | A | 12/1980 | Harris |
| 4,284,174 | A | 8/1981 | Salvana et al. |
| 4,289,360 | A | 9/1981 | Zirin |
| 4,478,551 | A | 10/1984 | Honeycutt, Jr. et al. |
| 4,649,114 | A | 3/1987 | Miltenburger et al. |
| 4,696,156 | A | 9/1987 | Burr et al. |
| 4,722,357 | A | 2/1988 | Wynosky |
| 4,976,102 | A | 12/1990 | Taylor |
| 4,979,362 | A | 12/1990 | Vershure, Jr. |
| 5,058,617 | A | 10/1991 | Stockman et al. |
| 5,102,379 | A | 4/1992 | Pagluica et al. |
| 5,141,400 | A | 8/1992 | Murphy et al. |
| 5,317,877 | A | 6/1994 | Stuart |
| 5,361,580 | A | 11/1994 | Ciokajlo et al. |
| 5,389,048 | A | 2/1995 | Carlson |
| 5,433,674 | A | 7/1995 | Sheridan et al. |
| 5,447,411 | A | 9/1995 | Curley et al. |
| 5,466,198 | A | 11/1995 | McKibbin et al. |
| 5,524,847 | A | 6/1996 | Brodell et al. |
| 5,634,767 | A | 6/1997 | Dawson |
| 5,677,060 | A | 10/1997 | Terentieva et al. |
| 5,685,797 | A | 11/1997 | Barnsby et al. |
| 5,778,659 | A | 7/1998 | Duesler et al. |
| 5,857,836 | A | 1/1999 | Stickler et al. |
| 5,915,917 | A | 6/1999 | Eveker et al. |
| 5,975,841 | A | 11/1999 | Lindemuth et al. |
| 5,985,470 | A | 11/1999 | Spitsberg et al. |
| 6,223,616 | B1 | 5/2001 | Sheridan |
| 6,315,815 | B1 | 11/2001 | Spadaccini et al. |
| 6,318,070 | B1 | 11/2001 | Rey et al. |
| 6,387,456 | B1 | 5/2002 | Eaton, Jr. et al. |
| 6,517,341 | B1 | 2/2003 | Brun et al. |
| 6,607,165 | B1 | 8/2003 | Manteiga et al. |
| 6,709,492 | B1 | 3/2004 | Spadaccini et al. |
| 6,814,541 | B2 | 11/2004 | Evans et al. |
| 6,883,303 | B1 | 4/2005 | Seda |
| 6,964,155 | B2 | 11/2005 | McCune et al. |
| 7,021,042 | B2 | 4/2006 | Law |
| 7,219,490 | B2 | 5/2007 | Dev |
| 7,328,580 | B2 | 2/2008 | Lee et al. |
| 7,374,403 | B2 | 5/2008 | Decker et al. |
| 7,591,754 | B2 | 9/2009 | Duong et al. |
| 7,632,064 | B2 | 12/2009 | Somanath et al. |
| 7,662,059 | B2 | 2/2010 | McCune |
| 7,806,651 | B2 | 10/2010 | Kennepohl et al. |
| 7,824,305 | B2 | 11/2010 | Duong et al. |
| 7,828,682 | B2 | 11/2010 | Smook |
| 7,926,260 | B2 | 4/2011 | Sheridan et al. |
| 7,997,868 | B1 | 8/2011 | Liang |
| 8,075,261 | B2 | 12/2011 | Merry et al. |
| 8,205,432 | B2 | 6/2012 | Sheridan |
| 8,261,527 | B1 | 9/2012 | Stearns et al. |
| 2003/0163983 | A1 | 9/2003 | Seda et al. |
| 2004/0103666 | A1 | 6/2004 | Jonsson et al. |
| 2005/0109012 | A1 | 5/2005 | Johnson |
| 2006/0177302 | A1 | 8/2006 | Berry |
| 2006/0228206 | A1 | 10/2006 | Decker et al. |
| 2008/0003096 | A1 | 1/2008 | Kohli et al. |
| 2008/0022653 | A1 | 1/2008 | Schilling |
| 2008/0116009 | A1 | 5/2008 | Sheridan et al. |
| 2008/0317588 | A1 | 12/2008 | Grabowski et al. |
| 2009/0056343 | A1 | 3/2009 | Suciu et al. |
| 2009/0071121 | A1 | 3/2009 | Suciu et al. |
| 2009/0304518 | A1 | 12/2009 | Kodama et al. |
| 2009/0314881 | A1 | 12/2009 | Suciu et al. |
| 2010/0105516 | A1 | 4/2010 | Sheridan et al. |
| 2010/0148396 | A1 | 6/2010 | Xie et al. |
| 2010/0212281 | A1 | 8/2010 | Sheridan |
| 2010/0218483 | A1 | 9/2010 | Smith |
| 2010/0331139 | A1 | 12/2010 | McCune |
| 2011/0159797 | A1 | 6/2011 | Beltman et al. |
| 2011/0164986 | A1 | 7/2011 | Roberts |
| 2011/0206498 | A1 | 8/2011 | McCooey |
| 2011/0293423 | A1 | 12/2011 | Bunker et al. |
| 2012/0124964 | A1 | 5/2012 | Hasel et al. |
| 2012/0251306 | A1 | 10/2012 | Reinhardt et al. |
| 2013/0025257 | A1 | 1/2013 | Suciu et al. |

FOREIGN PATENT DOCUMENTS

| | | |
|---|---|---|
| GB | 1516041 A | 6/1978 |
| GB | 2041090 A | 9/1980 |
| GB | 2426792 A | 12/2006 |
| WO | 2007038674 A1 | 4/2007 |

OTHER PUBLICATIONS

Hill, P.G., Peterson, C.R. (1992). Mechanics and thermodynamics of propulsion, 2nd Edition. Addison-Wesley Publishing Company, Inc. pp. 400-406.

Holcombe, V. (2003). Aero-Propulsion Technology (APT) task V low noise ADP engine definition study. NASA CR-2003-212521. Oct. 1, 2003. pp. 1-73.

Honeywell Learjet 31 and 35/36 TFE731-2 to 2C Engine Upgrade Program. Sep. 2005. pp. 1-4.

Honeywell LF502. Jane's Aero-engines, Aero-engines—Turbofan. Feb. 9, 2012.

Honeywell LF502. Jane's Aero-engines, Aero-engines—Turbofan. Aug. 17, 2016.

Honeywell LF507. Jane's Aero-engines, Aero-engines—Turbofan. Feb. 9, 2012.

(56) References Cited

OTHER PUBLICATIONS

Honeywell Sabreliner 65 TFE731-3 to -3D Engine Upgrade Program. Oct. 2005. pp. 1-4.
Honeywell TFE731. Jane's Aero-engines, Aero-engines—Turbofan. Jul. 18, 2012.
Honeywell TFE731 Pilot Tips. pp. 1-143.
Honeywell TFE731-5AR to -5BR Engine Conversion Program. Sep. 2005. pp. 1-4.
Horikoshi, S. and Serpone, N. (2013). Introduction to nanoparticles. Microwaves in nanoparticle synthesis. Wiley-VCH Verlag GmbH & Co. KGaA. pp. 1-24.
Howard, D.F. (1976). QCSEE preliminary under the wing flight propulsion system analysis report. NASA CR-134868. Feb. 1, 1976. pp. 1-260.
Howe, D.C. and Wynosky, T.A. (1985). Energy efficient engine program advanced turbofan nacelle definition study. NASA CR-174942. May 1, 1985. pp. 174.
Howe, D.C., and Wynosky, T.A. (1985). Energy efficient engine program advanced turbofan nacelle definition study. NASA-CR-174942. May 1985. pp. 1-60.
Howe, D.C., and Wynosky, T.A. (1985). Energy efficient engine program advanced turbofan nacelle definition study. NASA-CR-174942. May 1985. University of Washington dated Dec. 13, 1990. pp. 1-14.
Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.
Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.
Hughes, C. (2010). Geared turbofan technology. NASA Environmentally Responsible Aviation Project. Green Aviation Summit. NASA Ames Research Center. Sep. 8-9, 2010. pp. 1-8.
International Preliminary Report on Patentability for International Application No. PCT/US2014/035821 mailed Nov. 19, 2015.
International Search Report and Written Opinion for International Application No. PCT/US2014/035821 mailed Feb. 16, 2015.
Ivchenko-Progress AI-727M. Jane's Aero-engines, Aero-engines—Turbofan. Nov. 27, 2011.
Ivchenko-Progress D-436. Jane's Aero-engines, Aero-engines—Turbofan. Feb. 8, 2012.
Ivchenko-Progress D-727. Jane's Aero-engines, Aero-engines—Turbofan. Feb. 7, 2007.
Jacobson, N.S. (1993). Corrosion of silicon-based ceramics in combustion environments. J. Am. Ceram. Soc. 76(1). pp. 3-28.
Jeng, Y.-L., Lavernia, E.J. (1994). Processing of molybdenum disilicide. J. of Mat. Sci. vol. 29. 1994. pp. 2557-2571.
Johnston, R.P. and Hemsworth, M.C. (1978). Energy efficient engine preliminary design and integration studies. Jun. 1, 1978. pp. 1-28.
Johnston, R.P., Hirschkron, R., Koch, C.C., Neitzel, R.E., and Vinson, P.W. (1978). Energy efficient engine: Preliminary design and integration study—final report. NASA CR-135444. Sep. 1978. pp. 1-401.
Jorgensen, P.J., Wadsworth, M.E., and Cutler, I.B. (1961). Effects of water vapor on oxidation of silicon carbide. J. Am. Ceram. Soc. 44(6). pp. 248-261.
Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.
Kandebo, S.W. (1998). Geared-Turbofan engine design targets cost, complexity. Aviation Week & Space Technology, 148(8). p. 34-5.
Kandebo, S.W. (1998). Pratt & Whitney launches geared turbofan engine. Aviation Week & Space Technology, 148(8). p. 32-4.
Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.

Kasuba, R. and August, R. (1984). Gear mesh stiffness and load sharing in planetary gearing. American Society of Mechanical Engineers, Design Engineering Technical Conference, Cambridge, MA. Oct. 7-10, 1984. pp. 1-6.
Kerrebrock, J.L. (1977). Aircraft engines and gas turbines. Cambridge, MA: The MIT Press. p. 11.
Knip, Jr., G. (1987). Analysis of an advanced technology subsonic turbofan incorporating revolutionary materials. NASA Technical Memorandum. May 1987. pp. 1-23.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press. p. 465.
Krantz, T.L. (1990). Experimental and analytical evaluation of efficiency of helicopter planetary stage. NASA Technical Paper. Nov. 1990. pp. 1-19.
Krenkel, W., Naslain, R., and Schneider, H. Eds. (2001). High temperature ceramic matrix composites pp. 224-229. Weinheim, DE: Wiley-VCH Verlag GmbH.
Kurzke, J. (2001). GasTurb 9: A program to calculate design and off-design performance of gas turbines. Retrieved from: https://www.scribd.com/document/92384867/GasTurb9Manual.
Kurzke, J. (2012). GasTurb 12: Design and off-design performance of gas turbines. Retrieved from: https://www.scribd.com/document/153900429/GasTurb-12.
Kurzke, J. (2008). Preliminary Design, Aero-engine design: From state of the art turbofans towards innovative architectures. pp. 1-72.
Kurzke, J. (2009). Fundamental differences between conventional and geared turbofans. Proceedings of ASME Turbo Expo: Power for Land, Sea, and Air. 2009, Orlando, Florida. pp. 145-153.
Langston, L. and Faghri, A. Heat pipe turbine vane cooling. Prepared for Advanced Turbine Systems Annual Program Review. Morgantown, West Virginia. Oct. 17-19, 1995. pp. 3-9.
Lau, K., Gu, C., and Hui, D. (2005). A critical review on nanotube and nanotube/nanoclay related polymer composite materials. Composites: Part B 37(2006) 425-436.
Leckie, F.A. and Dal Bello, D.J. (2009). Strength and stiffness of engineering systems. Mechanical Engineering Series. Springer. pp. 1-10, 48-51.
Lee, K.N. (2000). Current status of environmental barrier coatings for Si-Based ceramics. Surface and Coatings Technology 133-134, 2000. pp. 1-7.
Levintan, R.M. (1975). Q-Fan demonstrator engine. Journal of Aircraft. vol. 12( 8). Aug. 1975. pp. 658-663.
Declaration of Reza Abhari, In re U.S. Pat. No. 8,448,895, Executed Nov. 28, 2016, pp. 1-81.
Declaration of Reza Abhari. In re U.S. Pat. No. 8,695,920, claims 1-4, 7-14, 17 and 19, Executed Nov. 29, 2016, pp. 1-102.
Declaration of Reza Abhari. In re U.S. Pat. No. 8,695,920. Executed Nov. 30, 2016, pp. 1-67.
Declaration of Reza Abhari, Ph.D. In re U.S. Pat. No. 8,844,265, Executed Jun. 28, 2016, pp. 1-91.
Defeo, A. and Kulina, M. (1977). Quiet clean short-haul experimental engine (QCSEE) main reduction gears detailed design final report. Prepared for NASA. NASA-CR-134872. Jul. 1977. pp. 1-157.
Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.
Drago, R.J. (1974). Heavy-lift helicopter brings up drive ideas. Power Transmission Design. Mar. 1987. pp. 1-15.
Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.
Dudley, D.W., Ed. (1954). Handbook of practical gear design. Lancaster, PA: Technomic Publishing Company, Inc. pp. 3.96-3.102 and 8.12-8.18.
Dudley, D.W., Ed. (1962). Gear handbook. New York, NY: McGraw-Hill. pp. 14-17 (TOC, Preface, and Index).

(56) References Cited

OTHER PUBLICATIONS

Dudley, D.W., Ed. (1962). Gear handbook. New York, NY: McGraw-Hill. pp. 3.14-3.18 and 12.7-12.21.
Dudley, D.W., Ed. (1994). Practical gear design. New York, NY: McGraw-Hill. pp. 119-124.
Edkins, D.P., Hirschkron, R., and Lee, R. (1972). TF34 turbofan quiet engine study. Final Report prepared for NASA. NASA-CR-120914. Jan. 1, 1972. pp. 1-99.
Edwards, T. and Zabarnick, S. (1993). Supercritical fuel deposition mechanisms. Ind. Eng. Chem. Res. vol. 32. 1993. pp. 3117-3122.
El-Sayad, A.F. (2008). Aircraft propulsion and gas turbine engines. Boca Raton, FL: CRC Press. pp. 215-219 and 855-860.
European Search Report for EP Application No. 14829601.5 dated Dec. 20, 2016.
Faghri, A. (1995). Heat pipe and science technology. Washington, D.C.: Taylor & Francis. pp. 1-60.
Falchetti, F., Quiniou, H., and Verdier, L. (1994). Aerodynamic design and 3D Navier-Stokes analysis of a high specific flow fan. ASME. Presented at the International Gas Turbine and Aeroengine Congress and Exposition. The Hague, Netherlands. Jun. 13-16, 1994. pp. 1-10.
File History for U.S. Appl. No. 12/131,876.
Fisher, K., Berton, J., Guynn, M., Haller B., Thurman, D., and Tong, M. (2012). NASA's turbofan engine concept study for a next-generation single-aisle transport. Presentation to ICAO's noise technology independent expert panel. Jan. 25, 2012. pp. 1-23.
Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.
Frankenfeld, J.W. and Taylor, W.F. (1980). Deposit fromation from deoxygenated hydrocarbons. 4. Studies in pure compound systems. Ind. Eng. Chem., Prod. Res. Dev., vol. 19(1). 1978. pp. 65-70.
Garret TFE731 Turbofan Engine (CAT C). Chapter 79: Lubrciation System. TTFE731 Issue 2. 2010. pp. 1-24.
Gates, D. Bombardier flies at higher market. Seattle Times. Jul. 13, 2008. pp. C6.
Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A155, 1992. pp. 147-158.
Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.
Gliebe, P.R., Ho, P.Y., and Mani, R. (1995). UHB engine fan and broadband noise reduction study. NASA CR-198357. Jun. 1995. pp. 1-48.
Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.
Gray, D.E. (1978). Energy efficient engine preliminary design and integration studies. NASA-CP-2036-PT-1. Nov. 1978. pp. 89-110.
Gray, D.E. (1978). Energy efficient engine preliminary design and integration studies. Prepared for NASA. NASA CR-135396. Nov. 1978. pp. 1-366.
Gray, D.E. and Gardner, W.B. (1983). Energy efficient engine program technology benefit/cost study—vol. 2. NASA CR-174766. Oct. 1983. pp. 1-118.
Greitzer, E.M., Bonnefoy, P.A., Delaroseblanco,E., Dorbian, C.S., Drela, M., Hall, D.K., Hansman, R.J., Hileman, J.I., Liebeck, R.H., Levegren, J. (2010). N+3 aircraft concept designs and trade studies, final report. vol. 1. Dec. 1, 2010. NASA/CR-2010-216794/vol. 1. pp. 1-187.
Griffiths, B. (2005). Composite fan blade containment case. Modern Machine Shop. Retrieved from: http://www.mmsonline.com/articles/composite-fan-blade-containment-case pp. 1-4.
Groweneweg, J.F. (1994). Fan noise research at NASA. NASA-TM-106512. Prepared for the 1994 National Conference on Noise Control Engineering. Fort Lauderdale, FL. May 1-4, 1994. pp. 1-10.

Groweneweg, J.F. (1994). Fan noise research at NASA. Noise-CON 94. Fort Lauderdale, FL. May 1-4, 1994. pp. 1-10.
Gunston, B. (Ed.) (2000). Jane's aero-engines, Issue seven. Coulsdon, Surrey, UK: Jane's Information Group Limited. pp. 510-512.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.
Guynn, M.D., et al., "Analysis of turbofan design options for an advanced single-aisle transport aircraft", American Institute of Aeronautics and Astronautics, 2009, pp. 1-13.
Guynn, M.D., Berton, J.J., Fisher, K.L., Haller, W.J., Tong, M.T., and Thurman, D.R. (2009). Engine concept study for an advanced single-aisle transport. NASA/TM-2009-215784. pp. 1-97.
Haldenbrand, R. and Norgren, W.M. (1979). Airesearch QCGAT program [quiet clean general aviation turbofan engines]. NASA-CR-159758. pp. 1-199.
Hall, C.A. and Crichton, D. (2007). Engine design studies for a silent aircraft. Journal of Turbomachinery, 129, 479-487.
Han, J., Dutta, S., and Ekkad, S.V. (2000). Gas turbine heat transfer and cooling technology. New York, NY: Taylor & Francis. pp. 1-25, 129-157, and 160-249.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.
Hazlett, R.N. (1991). Thermal oxidation stability of aviation turbine fuels. Philadelphia, PA: ASTM. pp. 1-163.
Heidelberg, L.J., and Hall, D.G. (1992). Acoustic mode measurements in the inlet of a model turbofan using a continuously rotating rake. AIAA-93-0598. 31st Aerospace Sciences Meeting. Reno, NV. Jan. 11-14, 1993. pp. 1-30.
Heidelberg, L.J., and Hall, D.G. (1992). Acoustic mode measurements in the inlet of a model turbofan using a continuously rotating rake. NASA-TM-105989. Prepared for the 31st Aerospace Sciences Meeting. Reno, NV. Jan. 11-14, 1993. pp. 1-30.
Heingartner, P., Mba, D., Brown, D. (2003). Determining power losses in the helical gear mesh; Case Study. ASME 2003 Design Engineering Technical Conferences. Chicago, IL. Sep. 2-6, 2003. pp. 1-7.
Hemighaus, G., Boval, T., Bacha, J., Barnes, F., Franklin, M., Gibbs, L., . . . Morris, J. (2007). Aviation fuels: Techincal review. Chevron Products Company. pp. 1-94. Retrieved from: https://www.cgabusinessdesk.com/document/aviation_tech_review.pdf.
Hendricks, E.S. and Tong, M.T. (2012). Performance and weight estimates for an advanced open rotor engine. NASA/TM-2012-217710. pp. 1-13.
Hess, C. (1998). Pratt & Whitney develops geared turbofan. Flug Revue 43(7). Oct. 1998.
2003 NASA seal/secondary air system workshop. (2003). NASA/CP-2004-212963/vol. 1. Sep. 1, 2004. pp. 1-408.
About GasTurb. Retrieved Jun. 26, 2018 from: http://gasturb.de/about-gasturb.html.
Adamson, A.P. (1975). Quiet Clean Short-Haul Experimental Engine (QCSEE) design rationale. Society of Automotive Engineers. Air Transportation Meeting. Hartford, CT. May 6-8, 1975. pp. 1-9.
Aerospace Information Report. (2008). Advanced ducted propulsor in-flight thrust determination. SAE International AIR5450. Aug. 2008. p. 1-392.
Agarwal, B.D and Broutman, L.J. (1990). Analysis and performance of fiber composites, 2nd Edition. John Wiley & Sons, Inc. New York: New York. pp. 1-11, 13-23, 26-33, 50-51, 56-58, 60-61, 64-71, 87-89, 324-329, 436-437.
AGMA Standard (1997). Design and selection of components for enclosed gear drives. lexandria, VA: American Gear Manufacturers Association. pp. 1-48.
AGMA Standard (1999). Flexible couplings—Mass elastic properties and other characteristics. Alexandria, VA: American Gear Manufacturers Association. pp. 1-46.
AGMA Standard (2006). Design manual for enclosed epicyclic gear drives. Alexandria, VA: American Gear Manufacturers Association. pp. 1-104.

(56) References Cited

OTHER PUBLICATIONS

Ahmad, F. and Mizramoghadam, A.V. (1999). Single v. two stage high pressure turbine design of modern aero engines. ASME. Prestend at the International Gast Turbine & Aeroengine Congress & Exhibition. Indianapolis, Indiana. Jun. 7-10, 1999. pp. 1-9.

Amezketa, M., Iriarte, X., Ros, J., and Pintor, J. (2009). Dynamic model of a helical gear pair with backlash and angle-varying mesh stiffness. Multibody Dynamics 2009, ECCOMAS Thematic Conference. 2009. pp. 1-36.

Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.

Anderson, R.D. (1985). Advanced Propfan Engine Technology (APET) definition study, single and counter-rotation gearbox/pitch change mechanism design. NASA CR-168115. Jul. 1, 1985. pp. 1-289.

Avco Lycoming Divison. ALF 502L Maintenance Manual. Apr. 1981. pp. 1-118.

Aviadvigatel D-110. Jane's Aero-engines, Aero-engines—Turbofan. Jun. 1, 2010.

Awker, R.W. (1986). Evaluation of propfan propulsion applied to general aviation. NASA CR-175020. Mar. 1, 1986. pp. 1-140.

Baker, R.W. (2000). Membrane technology and applications. New York, NY: McGraw-Hill. pp. 87-153.

Berton, J.J. and Guynn, M.D. (2012). Multi-objective optimization of a turbofan for an advanced, single-aisle transport. NASA/TM-2012-217428. pp. 1-26.

Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-284.

Bloomer, H.E. and Loeffler, I.J. (1982). QCSEE over-the-wing engine acoustic data. NASA-TM-82708. May 1, 1982. pp. 1-558.

Bloomer, H.E. and Samanich, N.E. (1982). QCSEE under-the-wing engine acoustic data. NASA-TM-82691. May 1, 1982. pp. 1-28.

Bloomer, H.E. and Samanich, N.E. (1982). QCSEE under-the-wing enging-wing-flap aerodynamic profile characteristics. NASA-TM-82890. Sep. 1, 1982. pp. 1-48.

Bloomer, H.E., Loeffler, I.J., Kreim, W.J., and Coats, J.W. (1981). Comparison of NASA and contractor reslts from aeroacoustic tests of QCSEE OTW engine. NASA Technical Memorandum 81761. Apr. 1, 1981. pp. 1-30.

Bornstein, N. (1993). Oxidation of advanced intermetallic compounds. Journal de Physique IV, 1993, 03 (C9), pp. C9-367-C9-373.

Brennan, P.J. and Kroliczek, E.J. (1979). Heat pipe design handbook. Prepared for National Aeronautics and Space Administration by B & K Engineering, Inc. Jun. 1979. pp. 1-348.

Brines, G.L. (1990). The turbofan of tomorrow. Mechanical Engineering: The Journal of the American Society of Mechanical Engineers, 108(8), 65-67.

Bucknell, R.L. (1973). Influence of fuels and lubricants on turbine engine design and performance, fuel and lubircant analyses. Final Technical Report, Mar. 1971-Mar. 1973. pp. 1-252.

Bunker, R.S. (2005). A review of shaped hole turbine film-cooling technology. Journal of Heat Transfer vol. 127. Apr. 2005. pp. 441-453.

Carney, K., Pereira, M. Revilock, and Matheny, P. (2003). Jet engine fan blade containment using two alternate geometries. 4th European LS-DYNA Users Conference. pp. 1-10.

Chapman J.W., et al., "Control Design for an Advanced Geared Turbofan Engine", AIAA Joint Propulsion Conference 2017, Jul. 10, 2017-Jul. 12, 2017, Atlanta, GA, pp. 1-12.

Cheryan, M. (1998). Ultrafiltration and microfiltration handbook. Lancaster, PA: Tecnomic Publishing Company, Inc. pp. 171-236.

Ciepluch, C. (1977). Quiet clean short-haul experimental engine (QCSEE) under-the-wing (UTW) final design report. Prepared for NASA. NASA-CP-134847. Retreived from: https://ntrs.nasa.gov/archive/nasa/casi.ntrs.nasa.gov/19800075257.pdf.

Clarke, D.R. and Levi, C.G. (2003). Materials design for the next generation thermal barrier coatings. Annual. Rev. Mater. Res. vol. 33. 2003. pp. 383-417.

Cramoisi, G. Ed. (2012). Death in the Potomac: The crash of Air Florida Flight 90. Air Crash Investigations. Accident Report NTSB/AAR-82-8. p. 45-47.

Cusick, M. (1981). Avco Lycoming's ALF 502 high bypass fan engine. Society of Automotive Engineers, Inc. Business Aircraft Meeting & Exposition. Wichita, Kansas. Apr. 7-10, 1981. pp. 1-9.

Daggett, D.L., Brown, S.T., and Kawai, R.T. (2003). Ultra-efficient engine diameter study. NASA/CR-2003-212309. May 2003. pp. 1-52.

Dalton, III., W.N. (2003). Ultra high bypass ratio low noise engine study. NASA/CR-2003-212523. Nov. 2003. pp. 1-187.

Daly, M. Ed. (2008). Jane's Aero-Engine. Issue Twenty-three. Mar. 2008. p. 707-12.

Daly, M. Ed. (2010). Jane's Aero-Engine. Issue Twenty-seven. Mar. 2010. p. 633-636.

Damerau, J. (2014) What is the mesh stiffness of gears? Screen shot of query submitted by Vahid Dabbagh, answered by Dr. Jochan Damerau, Research General Manager at Bosch Corp., Japan. Retrieved from: https://www.researchgate.net/post/What_is_the_mesh_stiffness_of_gears.

Darrah, S. (1987). Jet fuel deoxygenation. Interim Report for Period Mar. 1987-Jul. 1988. pp. 1-22.

Dassault Falcon 900EX Easy Systems Summary. Retrieved from: http://www.smartcockpit.com/docs/F900EX-Engines.pdf pp. 1-31.

Datasheet. CF6-80C2 high-bypass turbofan engines. Retreived from https://geaviation.com/sites/default/files/datasheet-CF6-80C2.pdf.

Datasheet. CFM56-5B for the Airbus A320ceo family and CFM56-7B for the Boeing 737 family. https://www.cfmaeroengines.com/.

Datasheet. Genx™ high bypass turbofan engines. Retreived from: https://www.geaviation.com/sites/default/files/datasheet-genx.pdf.

Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.

Davis, D.G.M. (1973). Variable-pitch fans: Progress in Britain. Flight International. Apr. 19, 1973. pp. 615-617.

Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.

Declaration of Dr. Magdy Attia, In re U.S. Pat. No. 8,313,280, Executed Oct. 21, 2016, pp. 1-88.

Declaration of Dr. Magdy Attia, In re U.S. Pat. No. 8,517,668, Executed Dec. 8, 2016, pp. 1-81.

Declaration of John Eaton, Ph.D. In re U.S. Pat. No. 8,689,568, Executed Mar. 28, 2016, pp. 1-87.

QCSEE under-the-wing engine composite fan blade design. (1975). NASA-CR-134840. May 1, 1975. pp. 1-51.

QCSEE under-the-wing engine composite fan blade final design test report. (1977). NASA-CR-135046. Feb. 1, 1977. pp. 1-55.

QCSEE under-the-wing engine composite fan blade preliminary design test report. (1975). NASA-CR-134846. Sep. 1, 1975. pp. 1-56.

QCSEE under-the-wing engine digital control system design report. (1978). NASA-CR-134920. Jan. 1, 1978. pp. 1-309.

Quiet clean general aviation turbofan (QCGAT) technology study final report vol. I. (1975). NASA-CR-164222. Dec. 1, 1975. pp. 1-186.

Ramsden, J.M. (Ed). (1978). The new European airliner. Flight International, 113(3590). Jan. 7, 1978. pp. 39-43.

Ratna, D. (2009). Handbook of thermoset resins. Shawbury, UK: iSmithers. pp. 187-216.

Rauch, D. (1972). Design study of an air pump and integral lift engine ALF-504 using the Lycoming 502 core. Prepare for NASA. Jul. 1972. pp. 1-182.

Reshotko, M., Karchmer, A., Penko, P.F. and McArdle, J.G. (1977). Core noise measurements on a YF-102 turbofan engine. NASA TM X-73587. Prepared for Aerospace Sciences Meeting sponsored by the American Institute of Aeronautics and Astronautics. Jan. 24-26, 2977.

(56) References Cited

OTHER PUBLICATIONS

Reynolds, C.N. (1985). Advanced prop-fan engine technology (APET) single- and counter-rotation gearbox/pitch change mechanism. Prepared for NASA. NASA CR-168114 (vol. I). Jul. 1985. pp. 1-295.
Riegler, C., and Bichlmaier, C. (2007). The geared turbofan technology—Opportunities, challenges and readiness status. Porceedings CEAS. Sep. 10-13, 2007. Berlin, Germany. pp. 1-12.
Rolls-Royce M45H. Jane's Aero-engines, Aero-engines—Turbofan. Feb. 24, 2010.
Rotordynamic instability problems in high-performance turbomachinery. (1986). NASA conference publication 2443. Jun. 2-4, 1986.
Roux, E. (2007). Turbofan and turbojet engines database handbook. Editions Elodie Roux. Blagnac: France. pp. 1-595.
Salemme, C.T. and Murphy, G.C. (1979). Metal spar/superhybrid shell composite fan blades. Prepared for NASA. NASA-CR-159594. Aug. 1979. pp. 1-127.
Sargisson, D.F. (1985). Advanced propfan engine technology (APET) and single-rotation gearbox/pitch change mechanism. NASA Contractor Report—168113. R83AEB592. Jun. 1, 1985. pp. 1-476.
Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.
Schaefer, J.W., Sagerser, D.R., and Stakolich, E.G. (1977). Dynamics of high-bypass-engine thrust reversal using a variable-pitch fan. Technical Report prepared for NASA. NASA-TM-X-3524. May 1, 1977. pp. 1-33.
Seader, J.D. and Henley, E.J. (1998). Separation process principles. New York, NY: John Wiley & Sons, Inc. pp. 722-726 and 764-771.
Shah, D.M. (1992). MoSi2 and other silicides as high temperature structural materials. Superalloys 1992. The Minerals, Metals, & Materials Society. pp. 409-422.
Shorter Oxford English Dictionary, 6th Edition. (2007), vol. 2, N-Z, pp. 1888.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.
Singh, A. (2005). Application of a system level model to study the planetary load sharing behavior. Jounal of Mechanical Design. vol. 127. May 2005. pp. 469-476.
Singh, B. (1986). Small engine component technology (SECT) study. NASA CR-175079. Mar. 1, 1986. pp. 1-102.
Singh, R. and Houser, D.R. (1990). Non-linear dynamic analysis of geared systems. NASA-CR-180495. Feb. 1, 1990. pp. 1-263.
Smith, C.E., Hirschkron, R., and Warren, R.E. (1981). Propulsion system study for small transport aircraft technology (STAT). Final report. NASA-CR-165330. May 1, 1981. pp. 1-216.
Smith-Boyd, L. and Pike, J. (1986). Expansion of epicyclic gear dynamic analysis program. Prepared for NASA. NASA CR-179563. Aug. 1986. pp. 1-98.
Sowers, H.D. and Coward, W.E. (1978). QCSEE over-the-wing (OTW) engine acuostic design. NASA-CR-135268. Jun. 1, 1978. pp. 1-52.
Spadaccini, L.J., and Huang, H. (2002). On-line fuel deoxygenation for coke suppression. ASME, Jun. 2002. pp. 1-7.
Spadaccini, L.J., Sobel, D.R., and Huang, H. (2001). Deposit formation and mitigation in aircraft fuels. Journal of Eng. for Gas Turbine and Power, vol. 123. Oct. 2001. pp. 741-746.
Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-1623.
Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-1946.
Sutliff, D. (2005). Rotating rake turbofan duct mode measurement system. NASA TM-2005-213828. Oct. 1, 2005. pp. 1-34.
Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.
Sweetman, B. and Sutton, O. (1998). Pratt & Whitney's surprise leap. Interavia Business & Technology, 53.621, p. 25.
Taylor, W.F. (1974). Deposit formation from deoxygenated hydrocarbons. I. General features. Ind. Eng. Chem., Prod. Res. Develop., vol. 13(2). 1974. pp. 133-138.
Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-68.
Taylor, W.F. and Frankenfeld, J.W. (1978). Deposit fromation from deoxygenated hydrocarbons. 3. Effects of trace nitrogen and oxygen compounds. Ind. Eng. Chem., Prod. Res. Dev., vol. 17(1). 1978. pp. 86-90.
Technical Data. Teflon. WS Hampshire Inc. Retrieved from: http://catalog.wshampshire.com/Asset/psg_teflon_ptfe.pdf.
Technical Report. (1975). Quiet Clean Short-haul Experimental Engine (QCSEE) UTW fan preliminary design. NASA-CR-134842. Feb. 1, 1975. pp. 1-98.
Technical Report. (1977). Quiet Clean Short-haul Experimental Engine (QCSEE) Under-the-Wing (UTW) final design report. NASA-CR-134847. Jun. 1, 1977. pp. 1-697.
Thulin, R.D., Howe, D.C., and Singer, I.D. (1982). Energy efficient engine: High pressure turbine detailed design report. Prepared for NASA. NASA CR-165608. pp. 1-178.
Tong, M.T., Jones, S.M., Haller, W.J., and Handschuh, R.F. (2009). Engine conceptual design studies for a hybrid wing body aircraft. NASA/TM-2009-215680. Nov. 1, 2009. pp. 1-15.
Trembley, Jr., H.F. (1977). Determination of effects of ambient conditions on aircraft engine emissions. ALF 502 combustor rig testing and engine verification test. Prepared for Environmental Protection Agency. Sep. 1977. pp. 1-256.
Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMCs. High Temperature Ceramic Matrix Composites. 4th Int'l Conf. on High Temp. Ceramic Matrix Composites. Oct. 1-3, 2001. pp. 149-156.
Tummers, B. (2006). DataThief III. Retrieved from: https://datathief.org/DatathiefManual.pdf pp. 1-52.
Turbomeca Aubisque. Jane's Aero-engines, Aero-engines—Turbofan. Nov. 2, 2009.
Turner, M. G., Norris, A., and Veres, J.P. (2004). High-fidelity three-dimensional simulation of the GE90. NASA/TM-2004-212981. pp. 1-18.
Type Certificate Data Sheet No. E6NE. Department of Transportation Federal Aviation Administration. Jun. 7, 2002. pp. 1-10.
U.S. Department of Transportation: Federal Aviation Administration Advisory Circular, Runway overrun prevention, dated: Nov. 6, 2007, p. 1-8 and Appendix 1 pp. 1-15, Appendix 2 pp. 1-6, Appendix 3 pp. 1-3, and Appendix 4 pp. 1-5.
Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.
Liebeck, R.H., Andrastek, D.A., Chau, J., Girvin, R., Lyon, R., Rawdon, B.K., Scott, P.W. et al. (1995). Advanced subsonic airplane design & economics studies. NASA CR-195443. Apr. 1995. pp. 1-187.
Litt, J.S. (2018). Sixth NASA Glenn Research Center propulsion control and diagnostics (PCD) workshop. NASA/CP-2018-219891. Apr. 1, 2018. pp. 1-400.
Lord, W.K., MacMartin, D.G., and Tillman, T.G. (2000). Flow control opportunities in gas turbine engines. American Institute of Aeronautics and Astronautics. pp. 1-15.
Lynwander, P. (1983). Gear drive systems: Design and application. New York, New York: Marcel Dekker, Inc. pp. 145, 355-358.
Macisaac, B. and Langston, R. (2011). Gas turbine propulsion systems. Chichester, West Sussex: John Wiley & Sons, Ltd. pp. 260-265.

(56) References Cited

OTHER PUBLICATIONS

Mancuso, J.R. and Corcoran, J.P. (2003). What are the differences in high performance flexible couplings for turbomachinery? Proceedings of the Thirty-Second Turbomachinery Symposium. 2003. pp. 189-207.
Manual. Student's Guide to Learning SolidWorks Software. Dassault Systemes—SolidWorks Corporation. pp. 1-156.
Matsumoto, T., Toshiro, U., Kishida, A., Tsutomu, F., Maruyama, I., and Akashi, M. (1996). Novel functional polymers: Poly(dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.
Mattingly, J.D. (1996). Elements of gas turbine propulsion. New York, New York: McGraw-Hill, Inc. pp. 1-18, 60-62, 223-234, 462-479, 517-520, 757-767, and 862-864.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 668-670, 673-675, 682-685, 697-705, 726-727, 731-732, 802-805, 828-830 and appendices.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 673-675, 682-685, 697-699, 703-705, 802-805, 862-864, and 923-925.
Mattingly, J.D. (1996). Elements of gas turbine propulsion. New York, New York: McGraw-Hill, Inc. pp. 8-15.
Mavris, D.N., Schutte, J.S. (2016). Application of deterministic and probabilistic system design methods and enhancements of conceptual design tools for ERA project final report. NASA/CR-2016-219201. May 1, 2016. pp. 1-240.
McArdle, J.G. and Moore, A.S. (1979). Static test-stand performance of the YF-102 turobfan engine with several exhaust configurations for the Quiet Short-Haul Research Aircraft (QSRA). Prepared for NASA. NASA-TP-1556. Nov. 1979. pp. 1-68.
McCracken, R.C. (1979). Quiet short-haul research aircraft familiarization document. NASA-TM-81149. Nov. 1, 1979. pp. 1-76.
McCune, M.E. (1993). Initial test results of 40,000 horsepower fan drive gear system for advanced ducted propulsion systems. AIAA 29th Joint Conference and Exhibit. Jun. 28-30, 1993. pp. 1-10.
McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.
Meier N. (2005) Civil Turbojet/Turbofan Specifications. Retrieved from http://jet-engine.net/civtfspec.html.
Merriam-Webster's collegiate dictionary, 10th Ed. (2001). p. 1125-1126.
Merriam-Webster's collegiate dictionary, 11th Ed. (2009). p. 824.
Meyer, A.G. (1988). Transmission development of TEXTRON Lycoming's geared fan engine. Technical Paper. Oct. 1988. pp. 1-12.
Middleton, P. (1971). 614: VFW's jet feederliner. Flight International, Nov. 4, 1971. p. 725, 729-732.
Misel, O.W. (1977). QCSEE main reduction gears test program. NASA CR-134669. Mar. 1, 1977. pp. 1-222.
Moxon, J. How to save fuel in tomorrow's engines. Flight International. Jul. 30, 1983. 3873(124). pp. 272-273.
Muhlstein, C.L., Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.
Munt, R. (1981). Aircraft technology assessment: Progress in low emissions engine. Technical Report. May 1981. pp. 1-171.
Nanocor Technical Data for Epoxy Nanocomposites using Nanomer 1.30E Nanoclay. Nnacor, Inc. Oct. 2004.
NASA Conference Publication. (1978). CTOL transport technology. NASA-CP-2036-PT-1. Jun. 1, 1978. pp. 1-531.
NASA Conference Publication. Quiet, powered-lift propulsion. Cleveland, Ohio. Nov. 14-15, 1978. pp. 1-420.
Neitzel, R., Lee, R., and Chamay, A.J. (1973). Engine and installation preliminary design. Jun. 1, 1973. pp. 1-333.
Neitzel, R.E., Hirschkron, R. and Johnston, R.P. (1976). Study of unconventional aircraft engines designed for low energy consumption. NASA-CR-135136. Dec. 1, 1976. pp. 1-153.
Newton, F.C., Liebeck, R.H., Mitchell, G.H., Mooiweer, M.A., Platte, M.M., Toogood, T.L., and Wright, R.A. (1986). Multiple Application Propfan Study (MAPS): Advanced tactical transport. NASA CR-175003. Mar. 1, 1986. pp. 1-101.
Norton, M. and Karczub, D. (2003). Fundamentals of noise and vibration analysis for engineers. Press Syndicate of the University of Cambridge. New York: New York. p. 524.
Oates, G.C. (Ed). (1989). Aircraft propulsion systems and technology and design. Washington, D.C.: American Institute of Aeronautics, Inc. pp. 341-344.
Parametric study of STOL short-haul transport engine cycles and operational techniques to minimize community noise impact. NASA-CR-114759. Jun. 1, 1974. pp. 1-397.
Parker, R.G. and Lin, J. (2001). Modeling, modal properties, and mesh stiffness variation instabilities of planetary gears. Prepared for NASA. NASA/CR-2001-210939. May 2001. pp. 1-111.
Petrovic, J.J., Castro, R.G., Vaidya, R.U., Peters, M.I., Mendoza, D., Hoover, R.C., and Gallegos, D.E. (2001). Molybdenum disilicide materials for glass melting sensor sheaths. Ceramic Engineering and Science Proceedings. vol. 22(3). 2001. pp. 59-64.
Press release. The GE90 engine. Retreived from: https://www.geaviation.com/commercial/engines/ge90-engine; https://www.geaviation.com/press-release/ge90-engine-family/ge90-115b-fan-completing-blade-testing-schedule-first-engine-test; and https://www.geaviation.com/press-release/ge90-engine-family/ge'scomposite-fan-blade-revolution-turns-20-years-old.
Product Brochure. Garrett TFE731. Allied Signal. Copyright 1987. pp. 1-24.
Pyrograf-III Carbon Nanofiber. Product guide. Retrieved Dec. 1, 2015 from: http://pyrografproducts.com/Merchant5/merchant.mvc?Screen=cp_nanofiber.
QCSEE ball spline pitch-change mechanism whirligig test report. (1978). NASA-CR-135354. Sep. 1, 1978. pp. 1-57.
QCSEE hamilton standard cam/harmonic drive variable pitch fan actuation system derail design report. (1976). NASA-CR-134852. Mar. 1, 1976. pp. 1-172.
QCSEE main reduction gears bearing development program final report. (1975). NASA-CR-134890. Dec. 1, 1975. pp. 1-41.
QCSEE over-the-wing final design report. (1977). NASA-CR-134848. Jun. 1, 1977. pp. 1-460.
QCSEE over-the-wing propulsion system test report vol. III—mechanical performance. (1978). NASA-CR-135325. Feb. 1, 1978. pp. 1-112.
QCSEE Preliminary analyses and design report. vol. 1. (1974). NASA-CR-134838. Oct. 1, 1974. pp. 1-337.
QCSEE preliminary analyses and design report. vol. II. (1974). NASA-CR-134839. Oct. 1, 1974. pp. 340-630.
QCSEE the aerodynamic and mechanical design of the QCSEE under-the-wing fan. (1977). NASA-CR-135009. Mar. 1, 1977. pp. 1-137.
QCSEE the aerodynamic and preliminary mechanical design of the QCSEE OTW fan. (1975). NASA-CR-134841. Feb. 1, 1975. pp. 1-74.
U.S. Department of Transportation: Federal Aviation Administration Advisory Circular. Standard operating procedures for flight deck crewmembers, Dated: Feb. 27, 2003, p. 1-6 and Appendices.
U.S. Department of Transportation: Federal Aviation Administration Type Certificate Data Sheet No. E6WE. Dated: May 9, 2000. p. 1-9.
Vasudevan, A.K. and Petrovic, J.J. (1992). A comparative overview of molybedenum disilicide composites. Materials Science and Engineering, A155, 1992. pp. 1-17.
Waters, M.H. and Schairer, E.T. (1977). Analysis of turbofan propulsion system weight and dimensions. NASA Technical Memorandum. Jan. 1977. pp. 1-65.

(56) References Cited

OTHER PUBLICATIONS

Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.

Wendus, B.E., Stark, D.F., Holler, R.P., and Funkhouse, M.E. (2003). Follow-on technology requirement study for advanced subsonic transport. Technical Report prepared for NASA. NASA/CR-2003-212467. Aug. 1, 2003. pp. 1-47.

Whitaker, R. (1982). ALF 502: plugging the turbofan gap. Flight International, p. 237-241, Jan. 30, 1982.

Wie, Y.S., Collier, F.S., Wagner, R.D., Viken, J.K., and Pfenniger, W. (1992). Design of a hybrid laminar flow control engine nacelle. AIAA-92-0400. 30th Aerospace Sciences Meeting & Exhibit. Jan. 6-9, 1992. pp. 1-14.

Wikipedia. Stiffness. Retrieved Jun. 28, 2018 from: https://en.wikipedia.org/wiki/Stiffness.

Wikipedia. Torsion spring. Retreived Jun. 29, 2018 from: https://en.wikipedia.org/wiki/Torsion_spring.

Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.

Willis, W.S. (1979). Quiet clean short-haul experimental engine (QCSEE) final report. NASA/CR-159473 pp. 1-289.

Winn, A. (Ed). (1990). Wide Chord Fan Club. Flight International, 4217(137). May 23-29, 1990. pp. 34-38.

Wright, G.H. and Russell, J.G. (1990). The M.45SD-02 variable pitch geared fan engine demonstrator test and evaluation experience. Aeronautical Journal., vol. 84(836). Sep. 1980. pp. 268-277.

Xie, M. (2008). Intelligent engine systems: Smart case system. NASA/CR-2008-215233. pp. 1-31.

Xu, Y., Cheng, L., Zhang, L., Ying, H., and Zhou, W. (1999). Oxidation behavior and mechanical properties of C/SiC composites with Si—MoSi2 oxidation protection coating. J. of Mat. Sci. vol. 34. 1999. pp. 6009-6014.

Zalud, T. (1998). Gears put a new spin on turbofan performance. Machine Design, 70(20), p. 104.

Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.

Zhao, J.C. and Westbrook, J.H. (2003). Ultrahigh-temperature materials for jet engines. MRS Bulletin. vol. 28(9). Sep. 2003. pp. 622-630.

GAS TURBINE ENGINE FRONT SECTION

CROSS REFERENCE TO RELATED APPLICATION

This application is a continuation of U.S. patent application Ser. No. 17/337,658, filed on Jun. 3, 2021, which is a continuation of U.S. patent application Ser. No. 15/007,263, filed on Jan. 27, 2016, which is a continuation of U.S. patent application Ser. No. 14/785,872, filed on Oct. 21, 2015, which is a National Stage Entry of PCT Application No. PCT/US2014/035821, filed on Apr. 29, 2014, which claims priority to U.S. Provisional Application No. 61/821,371 filed on May 9, 2013.

BACKGROUND

A turbofan engine includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

A speed reduction device such as an epicyclical gear assembly may be utilized to drive the fan section such that the fan section may rotate at a speed different than the turbine section so as to increase the overall propulsive efficiency of the engine. The geared architecture may be located in a front section of the engine and thereby influences how airflow paths are defined to the compressor section. Airflow efficiency into the compressor section provides increased overall engine efficiency and therefore any improvements are desirable.

Turbofan engine manufacturers continue to seek improvements to engine performance including improvements to thermal, transfer and propulsive efficiencies.

SUMMARY

A front section for a gas turbine engine according to an example of the present disclosure includes a fan section including a fan hub. The fan hub includes a hub diameter supporting a plurality of fan blades including a tip diameter. A ratio of the hub diameter to the tip diameter is between about 0.24 and about 0.36. A transitional entrance passage is configured to communicate flow between the fan section and a compressor section. The transitional entrance passage includes an inlet disposed at an inlet diameter and an outlet to the compressor section disposed at an outlet diameter. A ratio of the hub diameter to the inlet diameter is between about 0.65 and about 0.95.

In a further embodiment of any of the foregoing embodiments, the plurality of fan blades is less than twenty (20) fan blades.

In a further embodiment of any of the foregoing embodiments, the ratio of the hub diameter to the inlet diameter is between about 0.70 and about 0.90.

In a further embodiment of any of the foregoing embodiments, the fan section is configured to deliver air into a bypass duct, and a portion of air into the compressor section, with a bypass ratio defined as the volume of air delivered into the bypass duct compared to the volume of air delivered into the compressor section, and the bypass ratio being greater than about 10.

In a further embodiment of any of the foregoing embodiments, a pressure ratio across the fan section is less than about 1.5.

In a further embodiment of any of the foregoing embodiments, the compressor section includes a multi-stage low pressure compressor.

A gas turbine engine according to an example of the present disclosure includes a fan section including a fan hub. The fan hub includes a hub diameter supporting a plurality of fan blades including a tip diameter, a ratio of the hub diameter to the tip diameter being between about 0.24 and about 0.36. A compressor section includes a low pressure compressor and a high pressure compressor. A turbine section includes a fan drive turbine configured to drive the fan section and the low pressure compressor. The fan drive turbine has a greater number of stages than the low pressure compressor. The fan drive turbine has fewer stages than the high pressure compressor. A transitional entrance passage couples the fan section and the compressor section. The transitional entrance passage includes an inlet disposed at an inlet diameter and an outlet disposed at an outlet diameter. The inlet is adjacent to the fan section. The outlet is adjacent to the compressor section. A ratio of the hub diameter to the inlet diameter is between about 0.65 and about 0.95.

In a further embodiment of any of the foregoing embodiments, the low pressure compressor is a multi-stage compressor.

In a further embodiment of any of the foregoing embodiments, the ratio of the hub diameter to the inlet diameter is between about 0.70 and about 0.90.

In a further embodiment of any of the foregoing embodiments, the fan section is configured to deliver air into a bypass duct, and a portion of air into the compressor section, with a bypass ratio defined as the volume of air delivered into the bypass duct compared to the volume of air delivered into the compressor section. The bypass ratio is greater than about 6.

A further embodiment of any of the foregoing embodiments includes a geared architecture configured to rotate the fan hub at a lower relative speed than the fan drive turbine.

In a further embodiment of any of the foregoing embodiments, the plurality of fan blades is less than twenty (20) fan blades.

In a further embodiment of any of the foregoing embodiments, the low pressure compressor is a three stage compressor.

In a further embodiment of any of the foregoing embodiments, the ratio of the hub diameter to the inlet diameter is between about 0.70 and about 0.90.

In a further embodiment of any of the foregoing embodiments, the turbine section includes a high pressure turbine configured to drive the high pressure compressor, the high pressure turbine including at least two stages.

A method of designing a gas turbine engine according to an example of the present disclosure includes providing a fan section including a fan hub. The fan hub includes a hub diameter supporting fewer than 26 fan blades to define a tip diameter. A ratio of the hub diameter to the tip diameter is between about 0.24 and about 0.36. The method includes providing a compressor section coupled to a turbine section. The turbine section is configured to drive the fan section providing a transitional entrance passage coupling the fan section and the compressor section. The transitional entrance passage includes an inlet disposed at an inlet diameter and an outlet to the compressor section disposed at an outlet diameter. A ratio of the hub diameter to the inlet diameter is between about 0.70 and about 0.90.

In a further embodiment of any of the foregoing embodiments, the compressor section includes a low pressure compressor and a high pressure compressor. The low pressure compressor is a multi-stage compressor, and the high pressure compressor has a greater number of stages than the low pressure compressor.

In a further embodiment of any of the foregoing embodiments, the hub diameter supports fewer than 20 fan blades.

In a further embodiment of any of the foregoing embodiments, the fan section is configured to deliver air into a bypass duct, and a portion of air into the compressor section, with a bypass ratio defined as the volume of air delivered into the bypass duct compared to the volume of air delivered into the compressor section. The bypass ratio is greater than about 10.

A further embodiment of any of the foregoing embodiments includes providing a geared architecture configured to rotate the fan hub at a lower relative speed than the turbine section.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
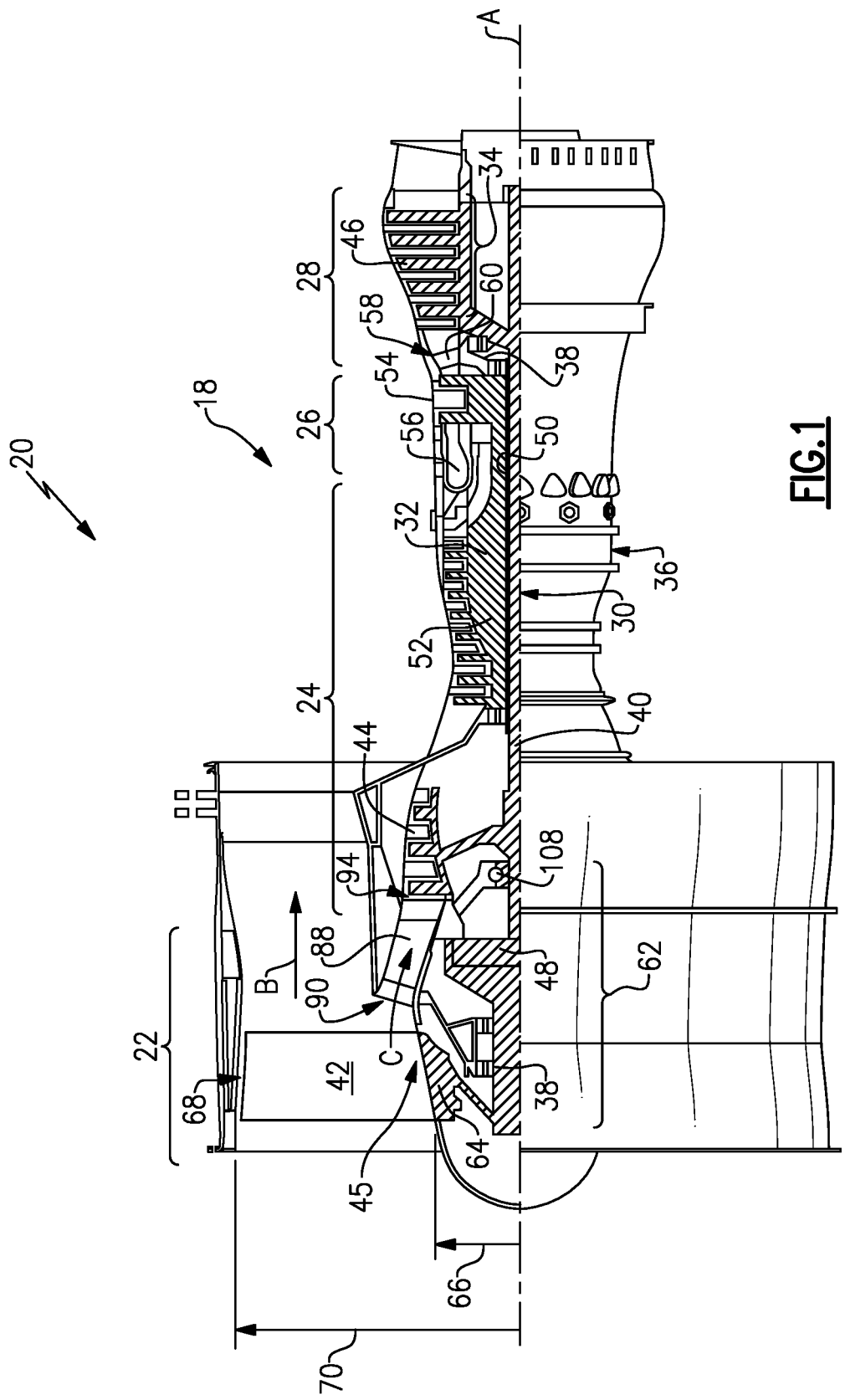
FIG. 1 is a schematic view of an example turbofan engine.

FIG. 1 schematically illustrates an example turbofan engine 20 that includes a fan section 22 and a core engine section 18 that includes a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core airflow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the turbofan engine 20 is increased and a higher power density may be achieved.

The disclosed turbofan engine 20 in one example is a high-bypass geared aircraft engine. In a further example, the turbofan engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the turbofan engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by airflow through the bypass flow path B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°\ R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example turbofan engine 20 with increased power transfer efficiency.

The gas turbofan engine 20 includes a front section 62 extending from the fan section 22 axially aft to bearing assembly 108 supporting a forward portion of the low speed spool 30. The front section 62 includes the fan section 22, the geared architecture 48, and compressor inlet passage 88 part of the core flow path C. The fan section 22 includes a fan hub 64 that supports the fan blades 42.

The fan hub 64 supports each of the blades 42 for rotation about the axis A. Each of the blades 42 includes a blade tip 68. A tip diameter 70 is disposed between opposing blade tips 68 and defines the diameter of the fan section 22. The blades 42 extend from a root portion 45 supported within a fan hub 64. The fan hub 64 defines a hub diameter 66. The hub diameter 66 is related to the tip diameter 70 according to a ratio that reflects a size of the bypass flow path B related to the core engine section 18. In the disclosed embodiment the ratio of hub diameter 66 to the tip diameter 70 is between about 0.24 and about 0.36.

The core flow path C includes a compressor inlet passage 88 that is disposed annularly about the geared architecture 48. The compressor inlet passage 88 includes an inlet 90 into supporting structure for the geared architecture 48 and the fan hub 64 and an outlet 94 aft of the supporting structure. The outlet 94 directs air into a first stage of the low pressure compressor 44. The hub 64, inlet 90 and outlet 94 define a path for air entering the turbofan engine 20 and entering the low pressure compressor 44.

Figure 2:
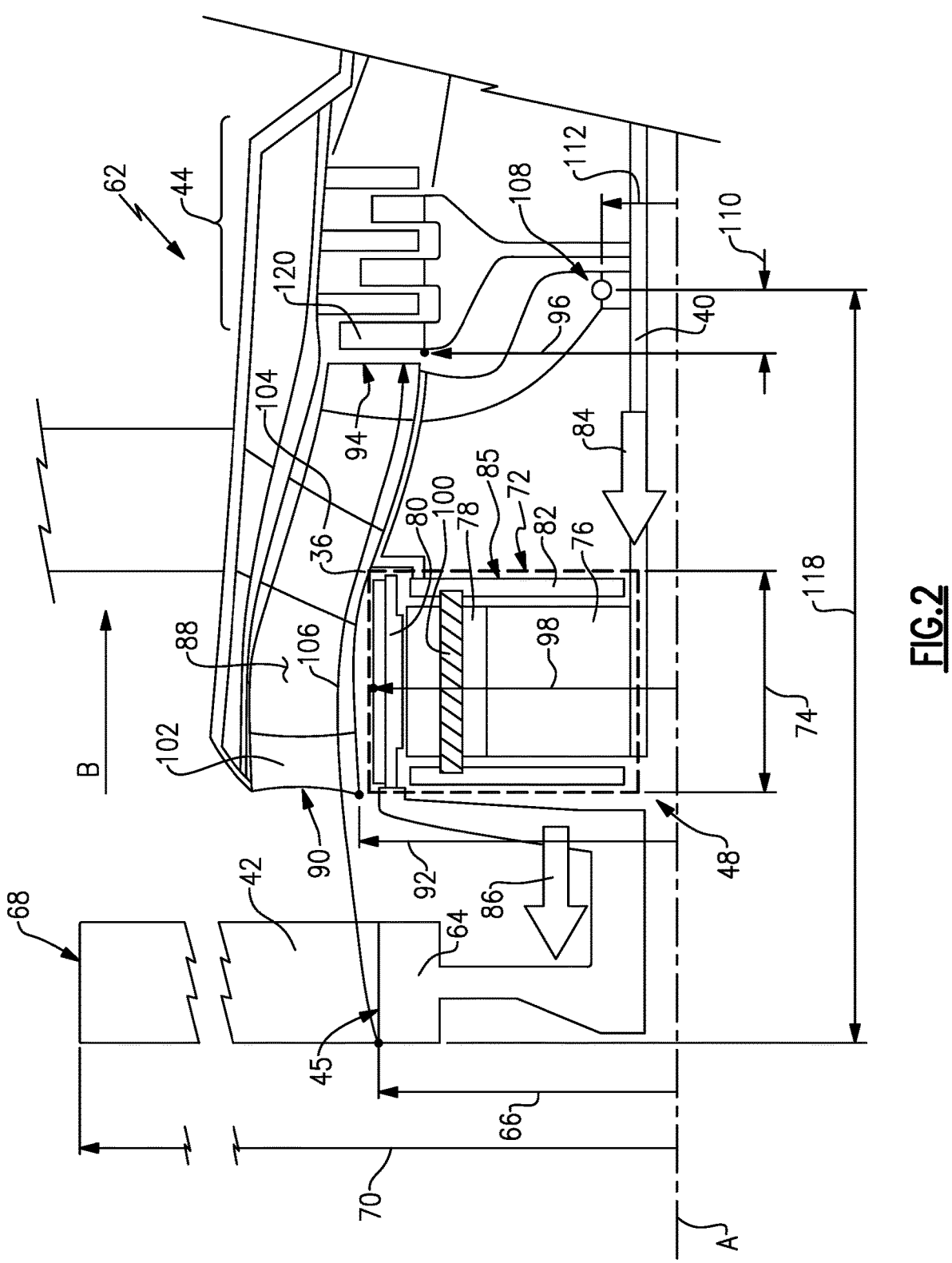
FIG. 2 is a schematic view of an example front section of a turbofan engine.

Referring to FIG. 2, with continued reference to FIG. 1, the inlet 90 is set at an inlet diameter 92 and the outlet 94 is set at an outlet diameter 96. The inlet 90 is at the leading edge and innermost radius of the first vane 102 aft of the fan section 22. The outlet 94 is the innermost radius of the first rotating airfoil 120 of the first or low pressure compressor 44. The hub diameter 66, inlet diameter 92 and outlet diameter 96 define a transitional flow path 106 into the low pressure compressor 44. The transitional flow path 106 includes complex flow fields with swirl components that are turned by vanes 102 and 104 within the compressor inlet passage 88 to provide desired axially oriented flows.

The transitional flow path 106 includes relatively low diametrical changes to provide a smooth aerodynamic flow path into the low pressure compressor 44. The shape of the transitional flow path 106 greatly improves and simplifies aerodynamic flow performance through the compressor inlet passage 88 to increase engine efficiency.

The shape of the transitional flow path 106 is defined by ratios between the hub diameter 66, inlet diameter 92 and outlet diameter 96. The disclosed transitional flow path 106 includes a ratio of the inlet diameter 92 to the outlet diameter 96 that is between about 1.10 and about 1.64, or more narrowly between about 1.24 and about 1.44. The transitional flow path 106 further includes a ratio of the hub diameter 66 to the inlet diameter 92 that is between about 0.65 and about 0.95, or more narrowly between about 0.70 and about 0.90.

In one example engine embodiment, the hub diameter 66 is between about 21.0 inches (53.34 cm) and about 26.0 inches (66.04 cm). The inlet diameter 92 is between about 26.5 inches (67.31 cm) and about 33.0 inches (83.82 cm). The outlet diameter 96 is between about 20.0 inches (50.8 cm) and about 24.5 inches (62.23 cm).

The inlet diameter 92 is the largest of the diameters 66, 92 and 96 defining the transitional flow path 106 and defines a necessary inflection point from the convergence of the root portion 45 of the fan blade 42 that provides desired aerodynamic performance.

The transitional flow path 106 between the hub diameter 66, the inlet diameter 92 and outlet diameter 96 is enabled by a gear diameter 98 defined by the geared architecture 48 and by the axial and radial position of the forward bearing assembly 108. The forward bearing assembly 108 is positioned axially and radially relative to the low pressure compressor 44 to enable the subtle changes in the transitional flow path 106. Accordingly, the inlet diameter 92, and therefore the desired inflection point is enabled by the size of the geared architecture 48, and the outlet diameter 96 is enabled by the size and position of the forward bearing assembly 108.

The geared architecture 48 includes a sun gear 76 driven by the low pressure turbine 46 through the inner shaft 40. The sun gear 76 drives intermediate planetary gears (either planet gears or star gears) 78 supported for rotation by journal bearings 100. A carrier 82 supports the journal bearings 100 and thereby the planetary gears 78. A ring gear 80 circumscribes the planetary gears 78. In this example, the ring gear 80 is attached to drive the fan hub 64 about the axis A. The carrier 82 is fixed and holds the intermediate planetary gears 78 from rotation about the axis A.

The geared architecture 48 illustrated in FIG. 1 is a star epicyclical configuration where the ring gear 80 is driven about the axis A and the carrier 80 is fixed to a portion of the engine static structure 36. However, other gear configurations are within the contemplation of this disclosure.

Figure 3:
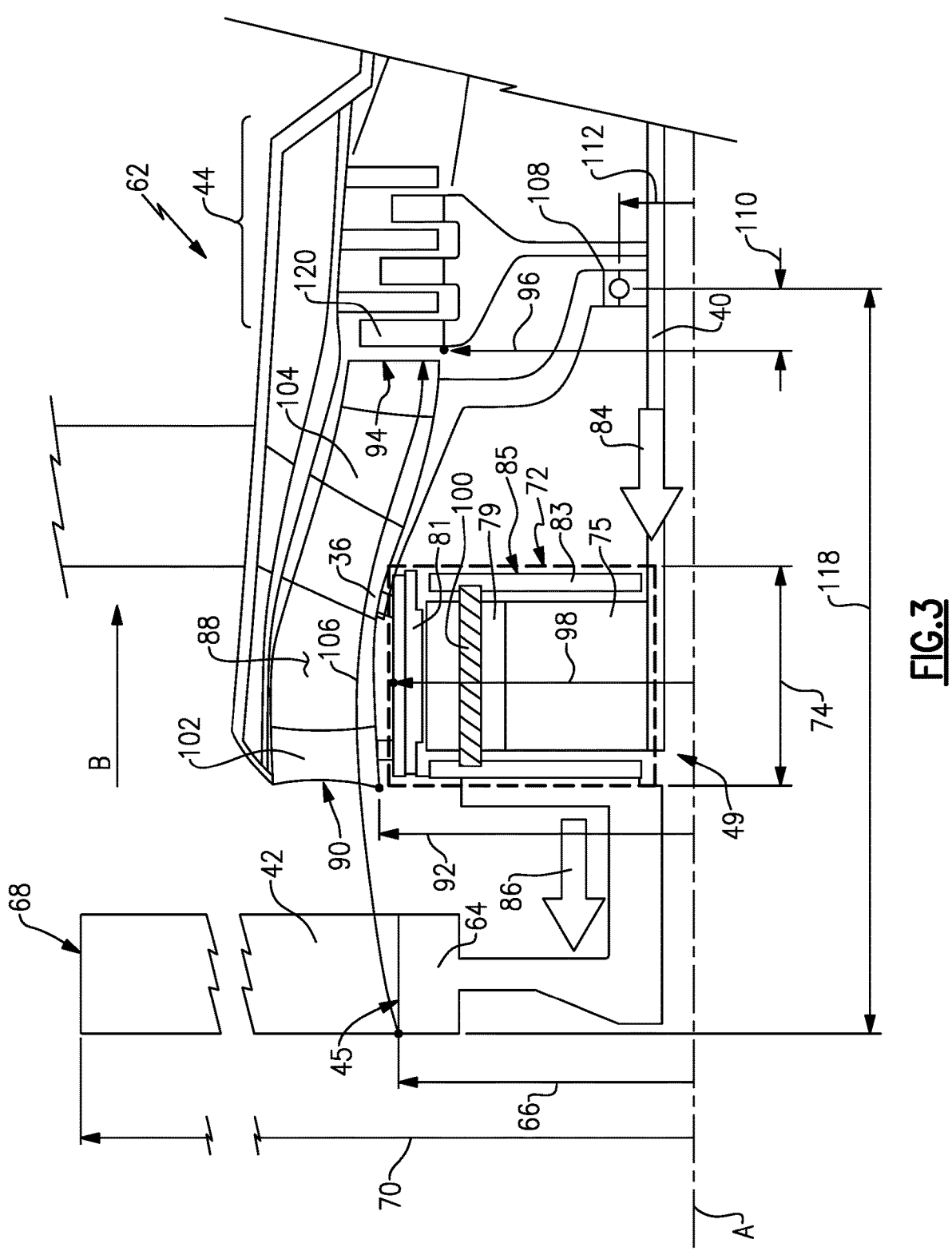
FIG. 3 is a schematic view of another example front section of a turbofan engine.

Referring to FIG. 3, another geared architecture 49 is shown that includes a sun gear 75 that drives planet gears 79 supported in a carrier 83 that is attached to drive a fan hub 65. A ring gear 81 circumscribes the planet gears 79 and is fixed to a portion of the engine static structure 36. The geared architecture 49 drives the fan hub 65 through rotation of the planet gears 79 and carrier 83 about the axis A and is referred to as a planet epicyclical gear configuration. The disclosed features and size are applicable to either of the disclosed geared architectures 48, 49 illustrated schematically in FIGS. 2 and 3. Further explanation and disclosure are explained with regard to the geared architecture 48 illustrated in FIG. 2, but is just as applicable to the embodiment illustrated and explained in FIG. 3.

Referring back to FIGS. 1 and 2, the carrier 82 includes an outer periphery 85 and the ring gear 80 includes the gear diameter 98 that combines to define a gear volume 72. The gear diameter 98 defined by the ring gear 80 and carrier 82 define the boundary of the gear volume 72. The gear volume 72 includes the elements of the geared architecture such as the journal bearings, 100, carrier 80, sun gear 76, planetary gears 78 and ring gear 80. The gear volume 72 does not encompass the mounting and flexible structures that may be utilized to support the geared architecture.

The gear volume 72 is the annular volume about the axis A, defined within the bounds of the gear diameter 98 and axial length 74. The axial length 74 of the geared architecture 48 includes the carrier 82. In the disclosed example, the geared architecture 48 includes an axial length 74 between about 4.16 inches (10.56 cm) and about 6.90 inches (17.53 cm).

The geared architecture 48 provides for the transmission of input horsepower 84 from the low pressure turbine 46 to output horsepower 86 to the fan section 22. The efficient transmission of input horsepower 84 is enabled by the configuration defining the gear volume 72. In this example, the gear volume is between about 1318 in$^3$ (21,598 cm$^3$) and about 1977 in$^3$ (32,397 cm$^3$).

The gearbox volume is necessary for the transfer of power from the fan drive or low pressure turbine 46 to the fan section 22. The gear diameter 98 is held close to the fan hub diameter 66 to define the flowpath 106 to be as short and unvarying in diameter as possible. The short and unvarying diameter of the transitional flow path 106 enables preferred pressure recovery between the fan blade root 45, the inlet 92 and the outlet 94 to the first rotating stage of the first or low pressure compressor 44.

In one example, the range of gear volume 72 is provided for an engine 20 that generates thrust ranging between about 21,000 lbf (93,412 N) and 35,300 lbf (157,022 N). The thrust generated is a function of the efficiency of the engine configuration and of the transfer of horsepower through the geared architecture 48. A measure of the efficiency of the geared architecture for a give volume is a power transfer parameter (PTP) and is defined as the power transferred through the geared architecture 48 divided by the gear volume 72 and multiplied by an overall gear ratio, a set out in Equation 1.

Equation 1: Power Transfer Parameter=[Power Transferred (HP)/Gear Volume (in$^3$)] x overall gear ratio.

The PTP provides a normalized factor for comparison between geared architectures for different engine configurations. Moreover the gear ratio accounts for the extra work performed for higher gear ratios. Embodiments of the geared turbofan engine that include the disclosed geared architecture 48 gear volumes 72 and that generate thrust ranging between about 21,000 lbf (93,412 N) and 35,300 lbf (157,022 N) include a PTP of between about 430 and about 645.

The PTP of the example geared architecture 48 enables increased transfer of power while maintaining a size and volume that further enables the transitional flow path 106 orientations that provide desired aerodynamic flow properties.

The forward bearing assembly 108 is disposed at an axial distance 110 from the outlet 94 to support rotation of the forward portion of the low speed spool 30 including the low pressure compressor 44. The position of the forward bearing assembly 108 provides a desired balance and rotational support of the low pressure compressor 44. Placement of the forward bearing assembly 108 is desired within a mid-region of the compressor 44 and requires a radial space sufficient to support lubricant and cooling features required during operation. Accordingly, a diameter 112 of the bearing assembly 108 has a direct effect on the configuration of the low pressure compressor 44 and thereby the position of the outlet 94. Moreover, the axial distance 118 from the forward tip of the hub 64 to the bearing assembly 108 is enabled by the size and volume of the geared architecture 48 and combined with the position of the forward bearing assembly 108 enables the desirable design of the transitional flow path 106.

In one disclosed dimensional engine embodiment the diameter 112 measured to a center point of the bearing assembly 108 is between about 7.25 inches (18.4 cm) and about 9.0 inches (22.86 cm). The axial distance 110 is between about 4.25 inches (10.79 cm) and 9.00 inches (22.86 cm). An overall axial length 118 of the front section 62 from the hub diameter 66 at the forward portion of the fan hub 64 to the forward bearing assembly is between about 33.00 inches (83.82 cm) and about 67.50 inches (171.45 cm). The axial distance 110 between the outlet 94 and the bearing assembly 108 enable the desired reduced length of the forward section 62.

The disclosed dimensional embodiment is only one example enabling the disclosed configuration of the transitional flow path 106. The configuration of disclosed engine embodiments is reflected in a ratio of the overall length 118 to the axial distance 110 that is between about 3.6 and 15.8. Moreover, a ratio between the outlet diameter 96 and the bearing assembly diameter 112 is between about 2.25 and 3.35. These ratios reflect the configuration that enables the radial and axial position of the outlet 94.

The axial length 74 of the geared architecture 48 further enables the desired relatively flat transitional flow path 106. The volume of the geared architecture 48 enables the power transfer to the fan hub 64 and is a factor determined by the axial length 74 and the gear diameter 98. Decreasing the gear diameter 98 enables a corresponding reduction in axial length 74 that in turn enables the desired configuration of the transitional flow path 106.

Therefore, a relationship between the axial length 74 of the geared architecture and the overall length 118 of the front section 62 further reflects the disclosed configuration of the transitional flow path 106 and engine 20. A ratio of the overall length 118 as related to the axial length 74 of the geared architecture 48 is between about 4.8 and about 16.2. The ratio of the overall length 118 to the axial length 74 reflects the disclosed geared architecture 48 including the gear diameter 98 and volume 72 that the desired configuration of the transitional flow path 106 and front section 62.

Accordingly, the gear volume 72, gear diameter 98, and axial length 74 of the geared architecture along with the location of the forward bearing assembly 108 enable an efficient transitional flow path 106 in the disclosed compact front section 62.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gas turbine engine comprising:
a propulsor section including a propulsor hub, the hub including a hub diameter supporting a plurality of propulsor blades;
a compressor section including a first compressor and a second compressor, and each of the first and second compressors including a plurality of stages;
a turbine section including a first turbine and a second turbine, wherein the second turbine drives the second compressor, and each of the first and second turbines includes a plurality of stages;
a geared architecture that interconnects the first turbine and the propulsor hub, the geared architecture including a gear volume between 1318 in$^3$ and 1977 in$^3$; and
a compressor inlet passage disposed annularly about the geared architecture, the compressor inlet passage coupling the propulsor section and the compressor section, the compressor inlet passage including an inlet disposed at an inlet diameter and an outlet disposed at an outlet diameter, the inlet adjacent to the propulsor section, the outlet adjacent to the compressor section, and a ratio of the propulsor hub diameter to the inlet diameter being between 0.65 and 0.95.

2. The gas turbine engine as recited in claim 1, wherein:
wherein the geared architecture includes an outer diameter that is less than the inlet diameter of the compressor inlet passage; and
the geared architecture comprises an epicyclic gear system including a sun gear, a ring gear, a plurality of intermediate gears and a carrier, wherein the ring gear circumscribes the plurality of intermediate gears, the plurality of intermediate gears are driven by the sun gear, and the carrier supports the plurality of intermediate gears, and the gear volume is defined within a space bounded by the ring gear and an outer periphery of the carrier.

3. The gas turbine engine as recited in claim 2, wherein each of the first compressor and the first turbine has a greater number of stages than the second turbine.

4. The gas turbine engine as recited in claim 3, wherein the plurality of propulsor blades include a tip diameter, and a ratio of the hub diameter to the tip diameter is between 0.24 and 0.36.

5. The gas turbine engine as recited in claim 4, wherein the inlet diameter is established at a leading edge and innermost radius of a first vane aft of the propulsor section, the outlet diameter is established at an innermost radius of a forwardmost rotating airfoil of the first compressor, and a ratio of the inlet diameter to the outlet diameter is between 1.10 and 1.64.

6. The gas turbine engine as recited in claim 5, wherein:
the geared architecture includes a gear reduction ratio of greater than 2.3; and
a power transfer parameter is defined as power transferred through the geared architecture divided by the gear volume multiplied by the gear reduction ratio, and the power transfer parameter is between 430 and 645.

7. The gas turbine engine as recited in claim 6, wherein the gas turbine engine is sized to generate thrust ranging between 21,000 lbf and 35,300 lbf.

8. The gas turbine engine as recited in claim 4, wherein the ratio of the hub diameter to the inlet diameter is between 0.70 and 0.90.

9. The gas turbine engine as recited in claim 8, wherein the ratio of the inlet diameter to the outlet diameter is between 1.24 and 1.44.

10. The gas turbine engine as recited in claim 9, further comprising:
a forward bearing assembly that supports a forward portion of a first shaft that drives the first compressor;
wherein the gas turbine engine includes an overall axial distance from a forward part of the propulsor hub to the forward bearing assembly, and a ratio of the overall axial distance to an axial length of the geared architecture is between 4.8 and 16.2.

11. The gas turbine engine as recited in claim 10, wherein:
a ratio between the overall axial distance and an axial length between the forward bearing assembly and the outlet to the compressor inlet passage is between 3.6 and 15.8;
the first turbine drives both the sun gear and the first compressor;
the geared architecture includes a gear reduction ratio of greater than 2.3; and
a power transfer parameter is defined as power transferred through the geared architecture divided by the gear volume multiplied by the gear reduction ratio, and the power transfer parameter is between 430 and 645.

12. The gas turbine engine as recited in claim 3, wherein the propulsor section is a fan section, the propulsor is a fan, the propulsor blades are fan blades, and the fan section includes an outer housing surrounding the fan blades to establish a bypass duct, and further comprising:
a bypass ratio of greater than 10.

13. The gas turbine engine as recited in claim 12, further comprising:
a pressure ratio across the fan section of less than 1.45 across the fan blades alone at cruise at 0.8 Mach and 35,000 feet.

14. The gas turbine engine as recited in claim 13, wherein:
the fan has less than 20 fan blades; and
a ratio between the number of the fan blades and the number of turbine rotors of the first turbine is between 3.3 and 8.6.

15. The gas turbine engine as recited in claim 14, wherein the inlet diameter is established at a leading edge and innermost radius of a first vane aft of the propulsor section, the outlet diameter is established at an innermost radius of a forwardmost rotating airfoil of the first compressor, and a ratio of the inlet diameter to the outlet diameter is between 1.10 and 1.64.

16. The gas turbine engine as recited in claim 14, wherein:
the geared architecture includes a gear reduction ratio of greater than 2.3; and
a power transfer parameter is defined as power transferred through the geared architecture divided by the gear volume multiplied by the gear reduction ratio, and the power transfer parameter is between 430 and 645.

17. The gas turbine engine as recited in claim 16, wherein the gas turbine engine is sized to generate thrust ranging between 21,000 lbf and 35,300 lbf.

18. The gas turbine engine as recited in claim 17, wherein the ratio of the hub diameter to the inlet diameter is between 0.70 and 0.90.

19. The gas turbine engine as recited in claim 14, wherein: the fan blades include a tip diameter, and a ratio of the hub diameter to the tip diameter is between 0.24 and 0.36.

20. The gas turbine engine as recited in claim 19, wherein the geared architecture is a planetary gear system, the carrier drives the fan hub, and the ring gear is fixed to an engine static structure.

21. The gas turbine engine as recited in claim 20, further comprising:
a forward bearing assembly that supports a forward portion of a first shaft that drives the first compressor;
wherein the gas turbine engine includes an overall axial distance from a forward part of the fan hub to the forward bearing assembly, and a ratio of the overall axial distance to an axial length of the geared architecture is between 4.8 and 16.2.

22. The gas turbine engine as recited in claim 21, wherein:
the inlet diameter is established at a leading edge and innermost radius of a first vane aft of the fan section, the outlet diameter is established at an innermost radius of a forwardmost rotating airfoil of the first compressor, and a ratio of the inlet diameter to the outlet diameter is between 1.10 and 1.64;
a ratio between the overall axial distance and an axial length between the forward bearing assembly and the outlet to the compressor inlet passage is between 3.6 and 15.8;
the first turbine drives both the sun gear and the first compressor;
the geared architecture includes a gear reduction ratio of greater than 2.3; and
a power transfer parameter is defined as power transferred through the geared architecture divided by the gear volume multiplied by the gear reduction ratio, and the power transfer parameter is between 430 and 645.

23. A front section of a gas engine comprising:
a propulsor section including a propulsor hub including a hub diameter supporting a plurality of propulsor blades about an axis, each of the plurality of propulsor blades including a tip diameter, and a ratio of the hub diameter to the tip diameter between 0.24 and 0.36;
a geared architecture driven by a turbine section for rotating the propulsor hub about the axis; and
a compressor entrance passage disposed around the geared architecture, the compressor entrance passage including an inlet disposed at an inlet diameter and an outlet disposed at an outlet diameter, wherein a ratio of the inlet diameter to the outlet diameter is between 1.10 and 1.64, and an overall axial length is established between a forward portion of the propulsor hub and a forward bearing assembly that supports a forward portion of a shaft that drives the geared architecture, and a ratio of the overall length to an axial length of the geared architecture is between 4.8 and 16.2.

24. The front section as recited in claim 23, wherein:
wherein the geared architecture includes an outer diameter that is less than the inlet diameter of the compressor inlet passage; and
the geared architecture comprises an epicyclic gear system including a sun gear, a ring gear, a plurality of intermediate gears and a carrier, wherein the ring gear circumscribes the intermediate gears, the intermediate gears are driven by the sun gear, and the carrier supports the intermediate gears, and a gear volume is defined within a space bounded by the ring gear and an outer periphery of the carrier.

25. The front section as recited in claim 24, wherein a ratio of the hub diameter to the inlet diameter is between 0.65 and 0.95.

26. The front section as recited in claim 25, wherein:
the geared architecture includes a gear reduction ratio of greater than 2.3; and
a power transfer parameter is defined as power transferred through the geared architecture divided by the gear volume multiplied by the gear reduction ratio, and the power transfer parameter is between 430 and 645.

27. A front section for a gas turbine engine comprising:
a propulsor section including a propulsor hub, the propulsor hub including a hub diameter supporting a plurality of propulsor blades including a tip diameter, a ratio of the hub diameter to the tip diameter being between 0.24 and 0.36;
a transitional entrance passage configured to communicate flow between the propulsor section and a compressor section including a low pressure compressor having a plurality of stages, the transitional entrance passage including an inlet disposed at an inlet diameter and an outlet to the compressor section disposed at an outlet diameter, the outlet adjacent to the compressor section, and a ratio of the hub diameter to the inlet diameter being between 0.70 and 0.90; and
wherein the outlet is axially forward of a forwardmost stage of the compressor section relative to an engine longitudinal axis, and a ratio of the inlet diameter to the outlet diameter is between 1.10 and 1.64.

28. The front section as recited in claim 27, wherein:
a geared architecture driven by a turbine section for rotating the propulsor about the engine longitudinal axis, the geared architecture including an outer diameter that is less than the inlet diameter of the transitional entrance passage; and
the geared architecture comprises an epicyclic gear system including a sun gear, a ring gear, a plurality of intermediate gears and a carrier, wherein the ring gear circumscribes the intermediate gears, the intermediate gears are driven by the sun gear, and the carrier supports the intermediate gears, and a gear volume is defined within a space bounded by the ring gear and an outer periphery of the carrier.

29. The front section as recited in claim 28, wherein:
the geared architecture includes a gear reduction ratio of greater than 2.3; and
a power transfer parameter is defined as power transferred through the geared architecture divided by the gear volume multiplied by the gear reduction ratio, and the power transfer parameter is between 430 and 645.

30. The front section as recited in claim 29, wherein the gas turbine engine is sized to generate thrust ranging between 21,000 lbf and 35,300 lbf.

* * * * *